United States Patent
Nory et al.

(10) Patent No.: US 9,681,401 B2
(45) Date of Patent: Jun. 13, 2017

(54) ENHANCED POWER HEADROOM REPORTING IN WIRELESS COMMUNICATION NETWORKS

(75) Inventors: Ravikiran Nory, Buffalo Grove, IL (US); Ravi Kuchibhotla, Gurnee, IL (US); Robert T. Love, Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1089 days.

(21) Appl. No.: 13/050,743

(22) Filed: Mar. 17, 2011

(65) Prior Publication Data

US 2012/0236735 A1    Sep. 20, 2012

(51) Int. Cl.
*H04W 52/36* (2009.01)
*H04L 5/00* (2006.01)
(Continued)

(52) U.S. Cl.
CPC ....... *H04W 52/367* (2013.01); *H04W 52/365* (2013.01); *H04L 5/0037* (2013.01);
(Continued)

(58) Field of Classification Search
USPC ........ 370/329, 432, 252, 344; 455/522, 509; 375/260
See application file for complete search history.

(56) References Cited

U.S. PATENT DOCUMENTS

2006/0221880 A1   10/2006   Riddington et al.
2008/0117852 A1   5/2008    Bennett et al.
(Continued)

FOREIGN PATENT DOCUMENTS

EP    2180620 A1    4/2010
TW    200836493 A   9/2008
(Continued)

OTHER PUBLICATIONS

LTE in a Nutshell: The Physical Layer, 2010 Telesystem Innovations Inc., retrieved from http://www.tsiwireless.com/docs/whitepapers/LTE%20in%20a%20Nutshell%20-%20Physical%20Layer.pdf on Mar. 13, 2013.*
Anritsu Company, "The LTE Resource Guide", Retrieved from: http://web.cecs.pdx.edu/~fli/class/LTE_Reource_Guide.pdf on Sep. 23, 2013, p. 6.*
3GPP TSG-RAN2 Meeting #71bis, R2-105960, 36.321 Change Request "Introduction of Carrier Aggregation" Ericsson, Xian, China, Oct. 11-15, 2010, 4 pages.
(Continued)

*Primary Examiner* — Andrew Lai
*Assistant Examiner* — Jamaal Henson
(74) *Attorney, Agent, or Firm* — Faegre Baker Daniels LLP

(57) ABSTRACT

A method in a wireless communication device includes determining a first configured maximum transmit power ($P_{CMAX}$) value corresponding to a first set of resource blocks (RBs) in a carrier for a subframe, wherein the first set of RBs includes less than a complete set of RBs constituting the carrier, determining a second $P_{CMAX}$ value corresponding to a second set of RBs in the carrier for the subframe, wherein the first and second sets of RBs are of a common type and the second set of RBs is different from the first set of RBs and the second set of RBs includes less than the complete set of RBs constituting the carrier. A composite report for the subframe including the first and second $P_{CMAX}$ values is then sent to a base station.

13 Claims, 6 Drawing Sheets

(51) Int. Cl.
*H04W 52/14* (2009.01)
*H04W 52/38* (2009.01)

(52) U.S. Cl.
CPC ......... *H04L 5/0091* (2013.01); *H04W 52/146* (2013.01); *H04W 52/38* (2013.01)

(56) References Cited

U.S. PATENT DOCUMENTS

| | | |
|---|---|---|
| 2008/0169910 A1 | 7/2008 | Greene et al. |
| 2010/0120446 A1 | 5/2010 | Gaal |
| 2010/0273515 A1* | 10/2010 | Fabien ............... H04L 5/006 455/509 |
| 2010/0296471 A1* | 11/2010 | Heo .................. H04W 52/365 370/329 |
| 2010/0296741 A1* | 11/2010 | Tang .................... G03B 27/48 382/216 |
| 2010/0297993 A1 | 11/2010 | Heo et al. |
| 2011/0201333 A1* | 8/2011 | Kwon ................ H04L 5/0091 455/434 |
| 2011/0250918 A1* | 10/2011 | Jen ..................... H04W 52/08 455/509 |
| 2012/0046064 A1* | 2/2012 | Baldemair ........... H04L 5/0007 455/522 |
| 2013/0010720 A1* | 1/2013 | Lohr .................. H04L 1/0026 370/329 |
| 2013/0064184 A1 | 3/2013 | Ishii |

FOREIGN PATENT DOCUMENTS

| | | |
|---|---|---|
| TW | 200843427 A | 11/2008 |
| TW | 1317581 A | 11/2009 |
| WO | 2009/022599 A1 | 2/2009 |

OTHER PUBLICATIONS

3GPP TSG RAN WG1 Meeting #58bis, R1-094274 "Uplink Power Control for Carrier Aggregation" Ericsson, ST-Ericsson; Miyazaki, Japan, Oct. 12-16, 2009, 4 pages.
TSG-RAN WG1 Meeting #62, R1-105761 "Way forward on PHR" Panasonic et al., Xian, China, Oct. 11-15, 2010, 2 pages.
3GPP RAN WG1 Meeting #62, R1-105802 "WF on PHR reference formats" Ericsson et al., Xian, China Oct. 11-15, 2010, 2 pages.
Patent Cooperation Treaty, "PCT Search Report and Written Opinion of the International Searching Authority" for International Application No. PCT/US2012/024946 dated Jun. 20, 2013, 22 pages.
3GPP TSG RAN WG2 #72, R2-106478 "PHR and P_CMAX Reporting" Motorola, Jacksonville, USA, Nov. 15-19, 2010, 4 pages.
3GPP TSG RAN WG2 #61, R2-081032 "Channel Quality Reporting for LTE MBMS" LG Electronics, Sorrento, Italy, Feb. 11-15, 2008, 4 pages.
3GPP TSG RAN WG1 #61, R1-102649 "Considerations on power headroom report in LTE-A" CATT, Montreal, Canada, May 10-14, 2010, 2 pages.
3GPP TSG RAN WG2 #73, R2-110797 Change Request "PHR Trigger for Power Reduction Due to Power Managements" Qualcomm Incorporated, Taipei, Taiwan, Feb. 21-25, 2011, 4 pages.
3GPP TSG RAN WG2 #7bis, R2-105708 "Activation/Deactiviation MAC Control Element" InterDigital Communications, Zian, China, Oct. 11-15, 2010, 6 pages.
Japan Patent Office, Notification of Reason for Rejection for Japanese Patent Application No. 2013-556642, mailed Jul. 1, 2014.
ROC (Taiwan) Intellectual Property Office, Search Report and Office Action for Taiwanese Patent Application No. 101108729, mailed Jan. 19, 2016.

* cited by examiner

ENHANCED POWER HEADROOM REPORTING IN WIRELESS COMMUNICATION NETWORKS

FIELD OF THE DISCLOSURE

The present disclosure relates generally to wireless communications and more particularly to interference mitigation in wireless communications networks.

BACKGROUND

In $3^{rd}$ Generation Partnership Project (3GPP) Long term Evolution (LTE) wireless communication systems, a user equipment (UE) transmits power headroom (PH) reports to the base station (also known as eNB in 3GPP LTE) to indicate the power headroom (PH) available for UE transmissions. The UE computes its PH according to the following formula:

$$PH_c(i) = P_{CMAX,c}(i) - \{10 \log_{10}(M_{PUSCH,c}(i)) + P_{O\_PUSCH,c}(j) + \alpha_c(j) \cdot PL + \Delta_{TF,c}(i) + f_c(i)\}$$

where "i" is the subframe and "c" is a component carrier (CC) or serving cell for which the PH is reported. $M_{PUSCH}$ is a Physical Uplink Shared Channel (PUSCH) resource allocation bandwidth signaled to the UE in terms of a number of resource blocks allocated to the UE in the sub-frame, PL is a downlink (DL) path loss estimate, $P_{O\_PUSCH}$ and $\alpha$ are open loop power control parameters, f(i) is a power control state obtained by accumulating closed loop power control commands and $\Delta_{TF}$ is the Modulation and Coding Scheme (MCS) based transmission power offset. A resource block has dimensions of subcarriers by symbols, where 12 subcarriers in the frequency domain and 6 or 7 symbols in the time domain form each resource block. $P_{CMAM}$ is the configured maximum output power for the UE and is a function of several parameters defined in 3GPP 36.101 including P_PowerClass (the nominal UE maximum transmit power), $P_{EMAX}$ (a transmit power limit signaled by the eNB to the UE), MPR (Maximum Power Reduction), A-MPR (Additional-Maximum Power Reduction), and $\Delta T_C$ (a maximum power adjustment made by the UE based on the frequency location of its carrier ). In LTE Release 10 (Rel-10), a separate value of $P_{CMAX}$ ($P_{CMAX, c}$) for each aggregated uplink (UL) component carrier is assumed. In LTE Rel-10, in addition to PH, $P_{CMAX}$ is also reported by the UE to the eNB. LTE Release 8 (Rel-8), $P_{CMAX}$ is defined by the equation below:

$$MIN\{(P_{EMAX} - \Delta T_C), (P_{PowerClass} - MPR - A\text{-}MPR - \Delta T_C)\} \leq P_{CMAX} \leq MIN\{P_{EMAX}, P_{PowerClass}\}$$

Here, MPR is a maximum power reduction (i.e., the UE may back-off its transmission power between 0 dB and MPR dB) allowed for the UE to account for transmissions with higher order modulation and larger carrier bandwidth. A-MPR is an additional maximum power reduction allowed for the UE when additional Adjacent Channel Leakage Ratio (ACLR) and spectrum emission requirements are signaled by the base station. The equation for $P_{CMAX}$ illustrates that the UE is allowed to apply a power back-off between 0 dB and (MPR+A-MPR+$\Delta T_C$) dB to determine its $P_{CMAX}$ value. The value of the back-off applied can vary between different UEs based on their RF implementation, so, the exact value of the power back-off applied by a particular UE to account for MPR and A-MPR allowances is not known to the eNB. The eNB can, at best, assume that the back-off applied by the UE is smaller than MPR+A-MPR+$\Delta T_C$ depending on the MCS level, Resource Block (RB) allocation within a given frequency band and additionally signaled ACLR and spectrum emission requirements.

LTE Rel-10 UL transmission mechanisms such as simultaneous transmission of the Physical Uplink Control Chanel (PUCCH) and PUSCH or transmission of multiple non-contiguous clusters of contiguous PUSCH Resource blocks (typically referred to as clustered PUSCH or non-contiguous PUSCH) would generate additional inter-modulation (IM) products in the UE transmitter chain. Under these circumstances, a new transmitter power back-off (in addition to the back-offs already required for LTE Rel-8) would likely be required to address the IM issues in LTE Rel-10. The value of the new back-off can be 4 dB to 10 dB depending on the number of resource blocks allocated to the UE and the location thereof. This new back-off is also expected to be included by the UE while computing $P_{CMAX,c}$ in LTE Rel-10.

The UE may also need to apply yet another new additional power back-off based on its RB allocation when configured for dual radio access technology (RAT) transmissions (e.g., simultaneous LTE and 1xRTT transmissions). There may be other scenarios where the UE may need to apply additional power back-off for certain RB allocations. Such scenarios include simultaneous LTE and WiFi transmissions and simultaneous LTE and Bluetooth transmissions.

Including these new additional back-off values in $P_{CMAX}$ computations and reporting the $P_{CMAX}$ (and also optionally the PH that is computed based on the $P_{CMAX}$) to the eNB will help the eNB to better understand UEs transmission power and transmission power headroom available. The eNB can use this information for more accurate scheduling and power control that increases network capacity.

In general, UEs in future LTE systems need to apply different power back-offs for different RB allocations to either meet ACLR and spectral emission requirements or to manage various terminal power management requirements or both. ACLR and spectral emission requirements must generally be met for simultaneous PUSCH and PUCCH transmissions or for non-contiguous PUSCH transmissions. Terminal power management requirements may be related to simultaneous LTE and 1xRTT transmissions, simultaneous LTE and WiFi transmissions, or simultaneous LTE and Bluetooth transmissions.

LTE-A supports sending multiple separate PH reports in a given sub-frame with each report corresponding to a particular serving cell associated with a particular component carrier as described in 3GPP contributions R2-105960, R1-094274, R1-105761 and R1-105802. The prior art identified does not discuss sending multiple PH and $P_{CMAX}$ reports in a given sub-frame for various subsets of PUSCH RBs (i.e., resource block groups) within a single carrier.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
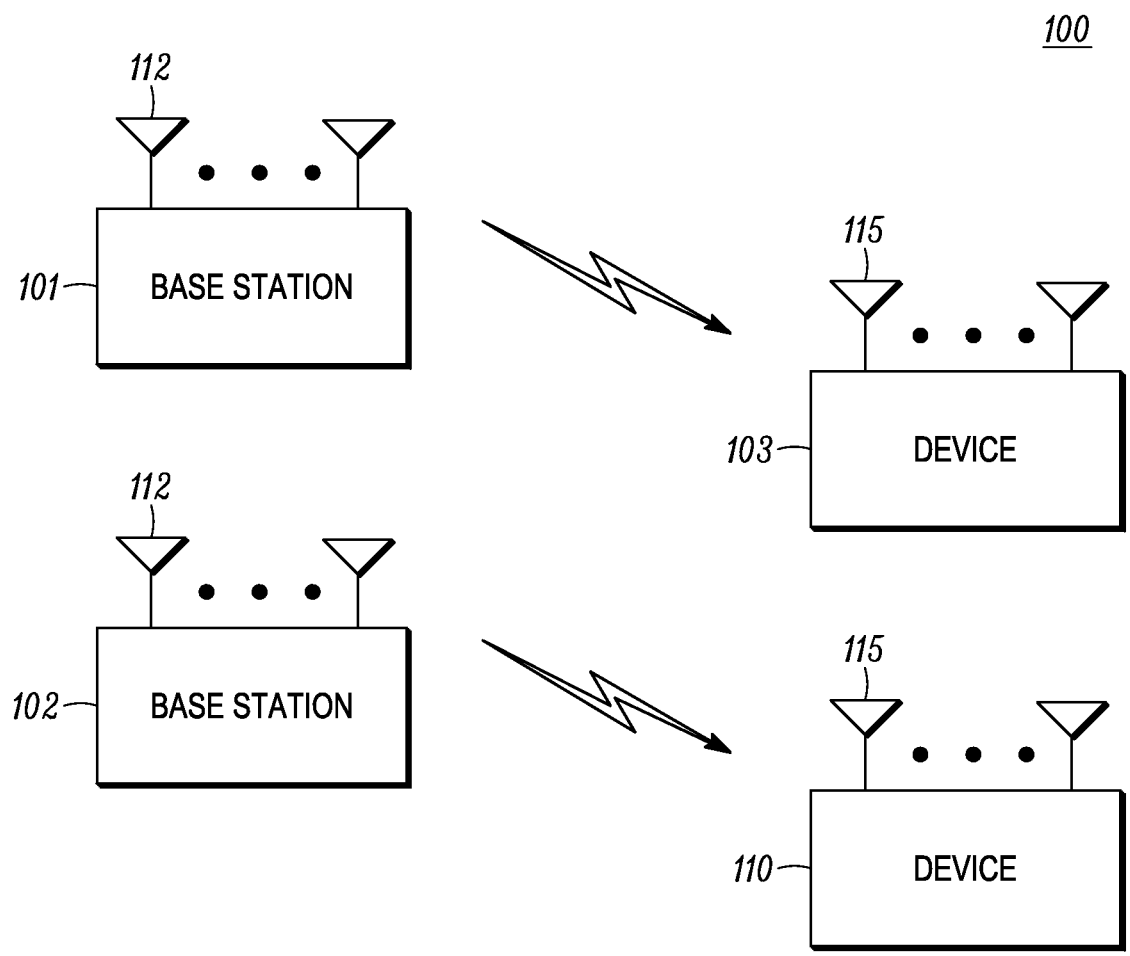
FIG. 1 illustrates a wireless communication system

In FIG. 1, a wireless communication system 100 comprises multiple cell serving base units forming a communications network distributed over a geographical region. A base unit may also be referred to as a base station, an access point (AP), access terminal (AT), Node-B (NB), enhanced Node-B (eNB) or by other once, present or future terminology used in the art. The one or more base units 101 and 102 serve a number of remote units 103 and 110 within a serving area or cell or within a sector thereof. The remote units may also be referred to as subscriber units, mobile units, users, terminals, subscriber stations, user equipment (UE), user terminals or by other terminology used in the art. The network base units communicate with remote units to perform functions such as scheduling the transmission and receipt of information using radio resources. The wireless communication network may also comprise management functionality including information routing, admission control, billing, authentication etc., which may be controlled by other network entities. These and other aspects of wireless networks are known generally by those having ordinary skill in the art.

In FIG. 1, base units 101 and 102 transmit downlink communication signals to remote units 103 and 110 on radio resources, which may be in the time, frequency and/or code domain. The remote units communicate with the one or more base units via uplink communication signals. The one or more base units may comprise one or more transmitters and one or more receivers that serve the remote units. The number of transmitters at the base unit may be related, for example, to the number of transmit antennas 112 at the base unit. When multiple antennas are used to serve each sector to provide various advanced communication modes, for example, adaptive beam-forming, transmit diversity, transmit SDMA, and multiple stream transmission, etc., multiple base units can be deployed. These base units within a sector may be highly integrated and may share various hardware and software components. For example, a base unit may also comprise multiple co-located base units that serve a cell. The remote units may also comprise one or more transmitters and one or more receivers. The number of transmitters may be related, for example, to the number of transmit antennas 115 at the remote unit.

In one implementation, the wireless communication system is compliant with the 3GPP Universal Mobile Telecommunications System (UMTS) LTE protocol, also referred to as EUTRA wherein the base unit transmits using an orthogonal frequency division multiplexing (OFDM) modulation scheme on the downlink and the user terminals transmit on the uplink using a single carrier frequency division multiple access (SC-FDMA) or a Discrete Fourier Transform spread OFDM (DFT-SOFDM) scheme. In yet another implementation, the wireless communication system is compliant with the 3GPP Universal Mobile Telecommunications System (UMTS) LTE-Advanced protocol, also referred to as LTE-A or some later generation or release of LTE wherein the base unit transmits using an orthogonal frequency division multiplexing (OFDM) modulation scheme on a single or a plurality of downlink component carriers and the user terminals can transmit on the uplink using a single or plurality of uplink component carriers. More generally the wireless communication system may implement some other open or proprietary communication protocol, for example, WiMAX, among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternative embodiments, the wireless communication system may utilize other communication system protocols including, but not limited to, TDMA or direct sequence CDMA. The communication system may be a TDD (Time Division Duplex) or FDD (Frequency Division Duplex) system.

Figure 2:
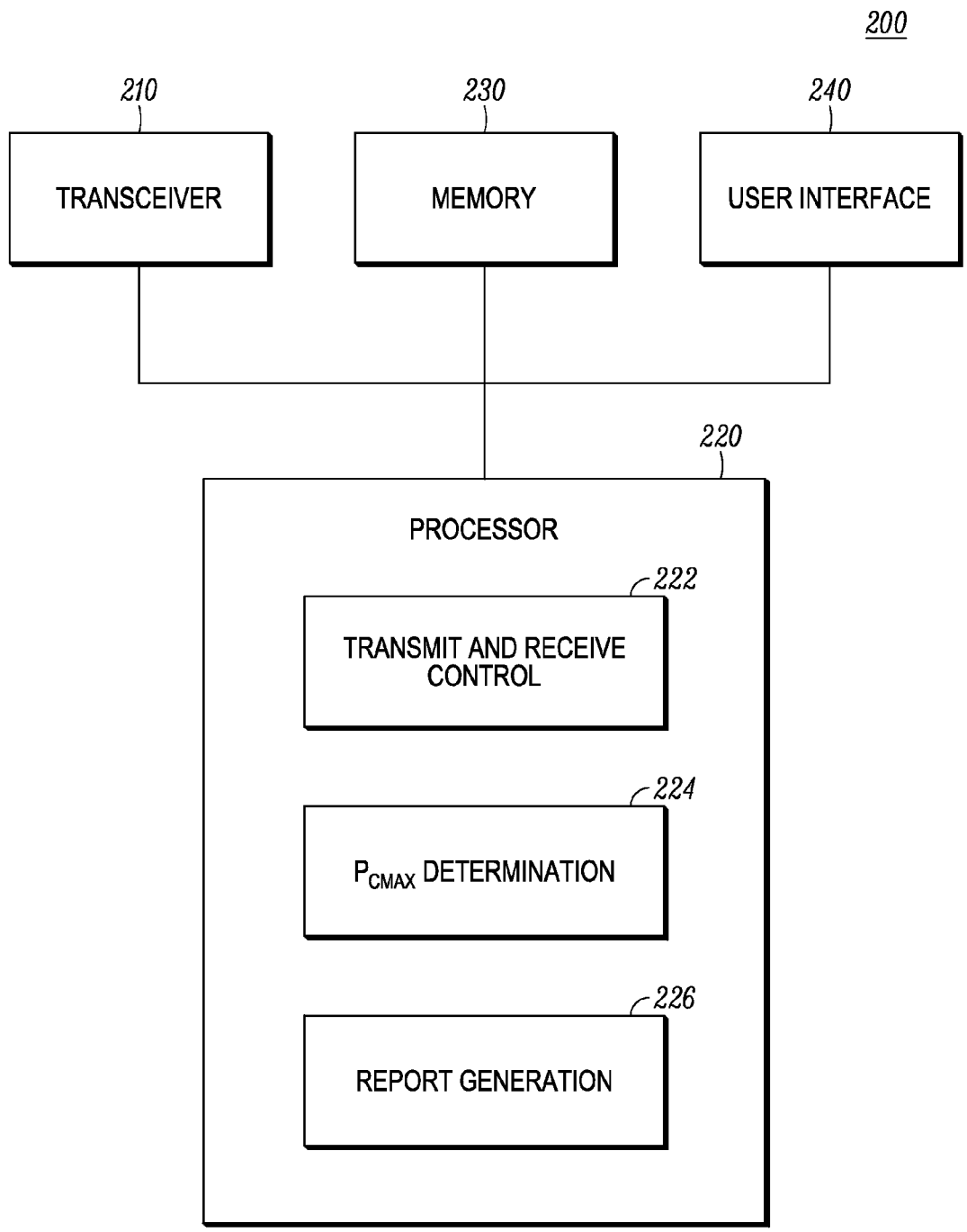
FIG. 2 illustrates a process flow diagram.

FIG. 2 illustrates a schematic block diagram of a wireless communication device 200 comprising generally a wireless transceiver 210 configured to communicate pursuant to a wireless communication protocol examples of which are discussed. The transceiver 210 is communicably coupled to a processor 220 that includes functionality 222 that controls the transmission and reception of information by the transceiver. The functionality of the controller is readily implemented as a digital processor that executes instructions stored in memory 230, which may be embodied as RAM or ROM or some other known memory device. When implemented as a user terminal or equipment (UE), the device 200 also includes a user interface 240, that typically includes tactile, visual and audio interface elements as is known generally by those having ordinary skill in the art. Other aspects of the wireless communication terminal that pertain to the instant disclosure are described further below.

It is generally beneficial for the UE to report PH and $P_{CMAX}$ to help the eNB better understand the maximum transmit power at which the UE can transmit and the power headroom available for the UE. In current systems, PH and $P_{CMAX}$ information that is reported for a particular sub-frame (regular PH reports and $P_{CMAX}$ reports) is computed based on the particular resource allocation in that sub-frame. A resource allocation generally includes allocation of frequency resources (typically RBs) along with means for identifying their location within the carrier bandwidth and an MCS to be used by the UE for transmitting on those frequency resources. One drawback of the current approach is that it does not give complete information about $P_{CMAX}$ and the PH in the frequency domain (e.g., for different RBs or different subsets of RBs) within a carrier/serving cell. Since uplink (UL) scheduling in LTE systems is in the time and frequency domains, frequency specific $P_{CMAX}$ and PH information at the eNB would enable the eNB scheduler to more efficiently allocate RBs within a carrier/serving cell to the UE. One option available to the eNB is to estimate RB specific PH and $P_{CMAX}$ information for a particular UE by storing information from multiple PH reports and $P_{CMAX}$ reports transmitted by the UE for different sub-frames with different resource allocations. The eNB can then process the stored information to create a composite report containing PH information and $P_{CMAX}$ information for all RB locations in a carrier/serving cell that were covered by the different resource allocations in different sub-frames for that carrier/serving cell. However, since the eNB typically serves a large number of UEs, creating such a composite PH report and $P_{CMAX}$ reports covering all RB locations in a carrier/serving cell for each UE is complex and resource intensive. Furthermore, the PH and $P_{CMAX}$ of the UE can change between different reports in different sub-frames for a variety of reasons (e.g., path loss change, fading, application of new transmit power control (TPC) commands received with or without TPC errors, MPR/A-MPR changes due to a received resource allocation conditioned on the UE's transmitter characteristic, among others). It is not possible for the eNB to isolate the frequency domain variation of the PH and $P_{CMAX}$ information from the time domain variation (i.e., variation between subframes) using regular PH and $P_{CMAX}$ reports. Therefore, it is not feasible for eNB implementations to estimate the PH and $P_{CMAX}$ information of the UE for various RB locations within a carrier based on regular PH reports and $P_{CMAX}$ reports that are supported in current LTE systems. Under these and possibly other circumstances enhanced PH and $P_{CMAX}$ reporting schemes are required.

Figure 3:
FIG. 3 illustrates a schematic block diagram of a wireless communication device.
Figure 3:

According to one aspect of the disclosure, illustrated in the process flow diagram of FIG. 3, at 310, a wireless communication device (e.g., a UE 103 in FIG. 1) determines a first configured maximum transmit power ($P_{CMAX}$) value corresponding to a first set of resource blocks (RBs) in a carrier for a subframe, wherein the first set of RBs includes less than a complete set of RBs constituting the carrier. At 320, the UE determines a second $P_{CMAX}$ value corresponding to a second set of RBs in the carrier for the subframe, wherein the first and second sets of RBs contain RBs of a common type and the second set of RBs is different than the first set of RBs and the second set of RBs includes less than the complete set of RBs constituting the carrier. In FIG. 2, the processor includes $P_{CMAX}$ determination functionality that is readily implemented by execution of instructions stored in memory. In alternative embodiments this functionality may be performed by a hardware equivalent circuit or by a combination of hardware and software. In FIG. 3, at 330, the UE sends a composite report for the subframe including at least the first $P_{CMAX}$ value and the second $P_{CMAX}$ value to a base station.

In some embodiments, the UE sends an identification of the first and second sets of RBs to the base station. In FIG. 2, the processor includes composite report generation functionality 226 that the processor may readily implement by executing programmed instructions stored in memory. In alternative embodiments this functionality may be performed by a hardware equivalent circuit or by a combination of hardware and software. In some implementations, the composite report is sent to the base station in response to receiving an explicit request from the base station for an enhanced $P_{CMAX}$ report. More generally however, the UE does not require a prompt to send the composite report as described further below.

Figure 4:
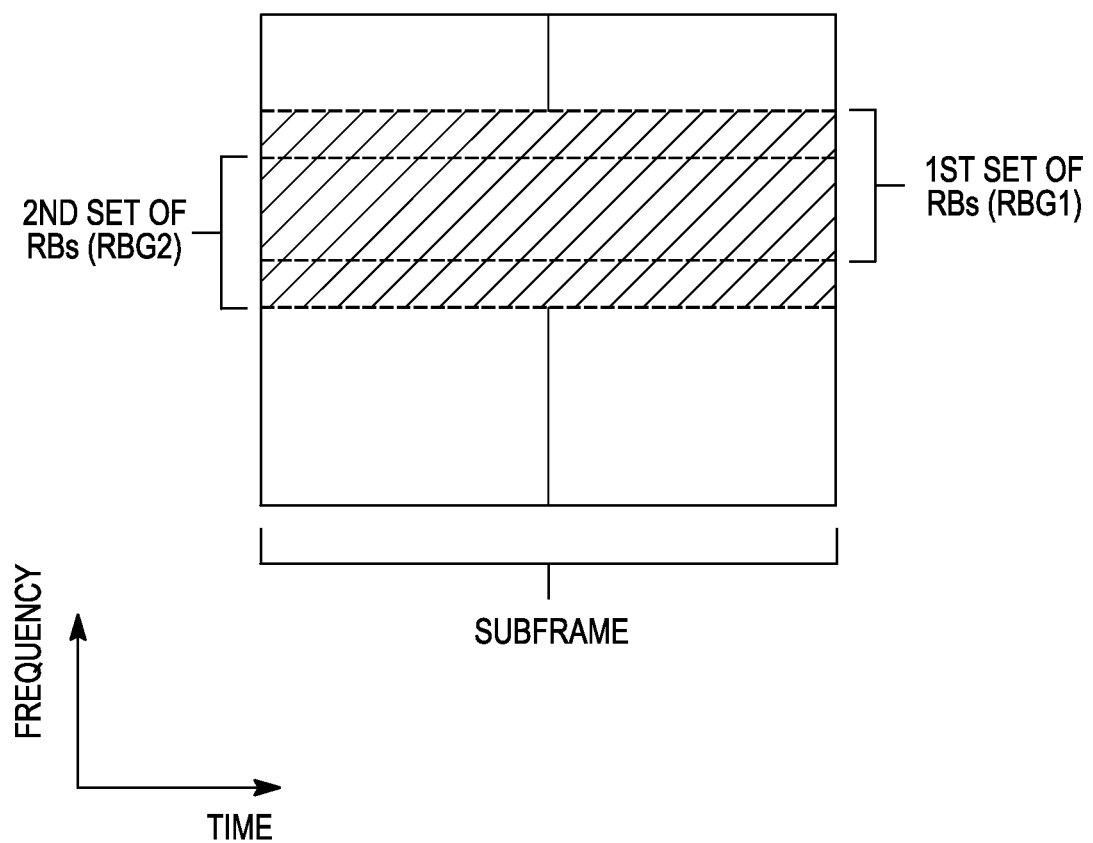
FIG. 4 illustrates first and second sets of RBs partially overlapping in the frequency domain.
Figure 5:
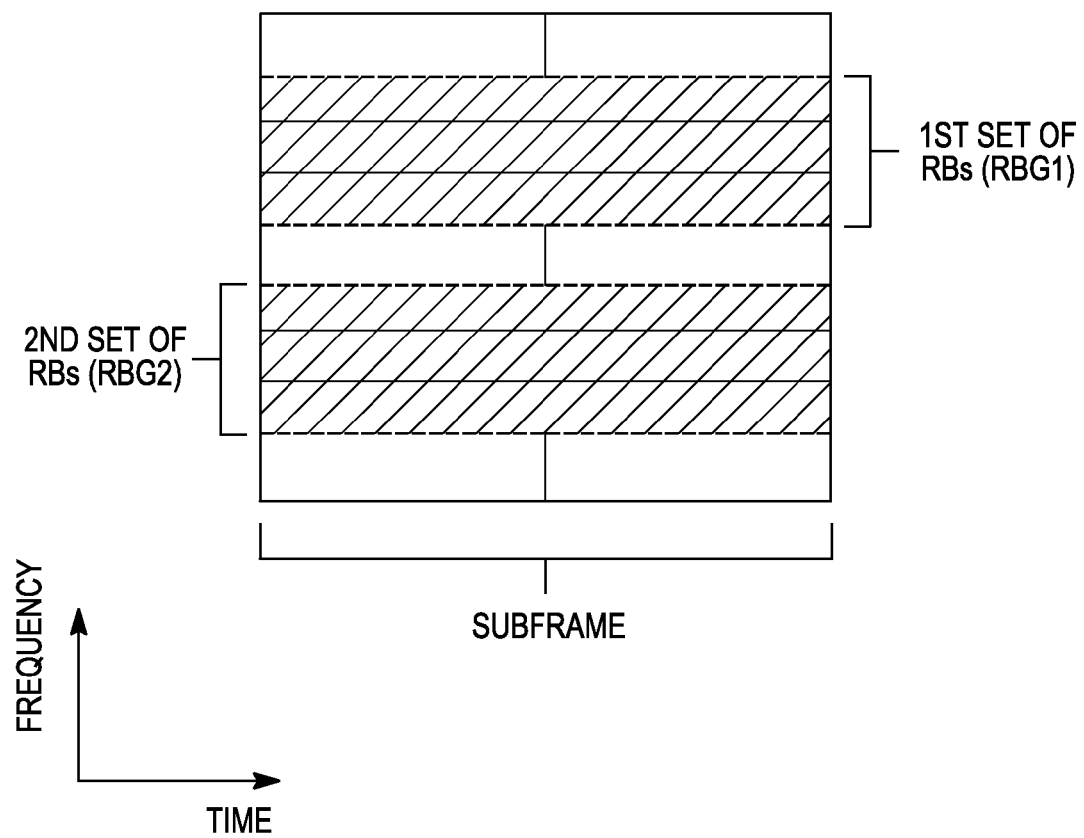
FIG. 5 illustrates first and second sets of RBs different in the frequency domain.
Figure 6:
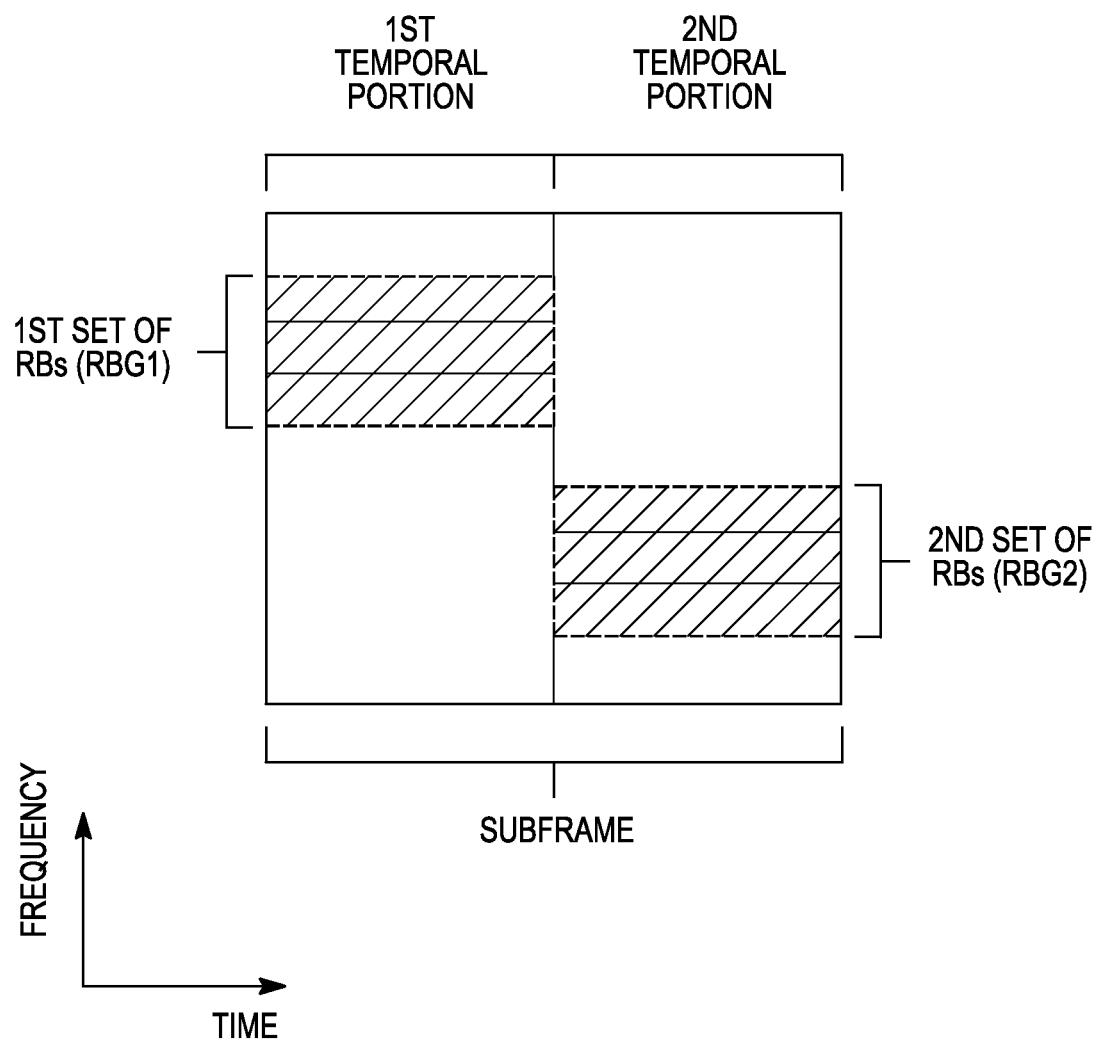
FIG. 6 illustrates a first set of RBs for a first temporal portion of a subframe and a second set of resource blocks (RBs) for a second temporal portion of the subframe.

In one embodiment, the first and second sets of RBs are partially overlapping in the frequency domain, as illustrated in FIG. 4. In another embodiment, the first and second set of RBs are different in the frequency domain as illustrated in FIG. 5. In one implementation, the UE determines the first $P_{CMAX}$ value for the first set of RBs for a first temporal portion of the subframe and the UE determines the second $P_{CMAX}$ value for the second set of RBs for a second temporal portion of the subframe, wherein the first and second temporal portions or regions of the subframe are non-overlapping and the first and second portions constitute a fraction of the subframe as illustrated in FIG. 6. In another embodiment, the second set of RBs does not overlap the first set of RBs, wherein the first and second sets of RBs constitute a complete set of physical uplink shared channel (PUSCH) RBs of the carrier. In one embodiment where the first set of RBs includes at least two RBs, the UE determines a $P_{CMAX}$ value for each of the at least two RBs wherein the $P_{CMAX}$ value for one of the at least two RBs is lower than a $P_{CMAX}$ value for the other RBs. In one embodiment, for the first $P_{CMAX}$ value sent to the base station, the UE sends only the lower $P_{CMAX}$ value to the base station.

In some embodiments, the UE determines a first Power Headroom (PH) value corresponding to the first set of RBs and a second PH value corresponding to the second set of RBs. The UE may then send the first PH value and the second PH value to the base station in a composite report with or without the first and second $P_{CMAX}$ values.

With enhanced $P_{CMAX}$ and/or PH reporting, the UE can send an enhanced $P_{CMAX}$ and/or PH report (also referred to as frequency domain $P_{CMAX}$ and/or PH report) to the eNB with information on $P_{CMAX}$ and/or PH of the UE for different subsets of PUSCH RBs in a carrier/serving cell for a subframe. Each subset of RBs can be considered a Resource Block Group (RBG). An RBG typically comprises a set of one or more contiguous or non-contiguous RBs within a carrier/serving cell. Also, as suggested above, the RBs included in a RBG are less than the complete set of RBs constituting the carrier/serving cell. Different RBGs generally comprise different sets of RBs although some RBs can be same between RBGs. For, example, RBG0 may comprise {RB0, RB1, RB2} while RBG1 may comprise {RB2, RB3, RB4}. In another mapping example, RBG0 may comprise {RB0, RB1} while RBG1 may comprise {RB0, RB49} assuming there are 50 RBs in the carrier. In another example, RBG0 may comprise {RB0, RB1, ... RB10} while RBG1 may comprise {RB11, RB12, ... RB49} assuming there are 50 RBs in the carrier. Different RBGs within the carrier may comprise same or different number of RBs. Information about the number of RBGs within a carrier used in the calculation of enhanced $P_{CMAX}$ and/or PH reporting, the number of RBs within each RBG and the specific RB to RBG mapping can be known a priori to both UE and eNB. Alternatively, the eNB can send this information to the UE via either Radio Resource Control (RRC) signaling or Medium Access Control (MAC) layer signaling or physical layer signaling.

A UE can be allocated or assigned to transmit multiple types of RBs based on the physical channel associated with those RBs. The type of RBs on which the UE transmits PUSCH information is called PUSCH RBs. PUSCH RBs are primarily allocated by the eNB for the transmission of user data from the UE. User data is also referred to as uplink shared channel (UL-SCH) data. In some subframes, PUSCH RBs may additionally carry control data from the UE to the eNB. Control data includes Channel Quality Information (CQI), ACK/NACK feedback information, Scheduling Request (SR) information. The type of RBs on which the UE transmits PUCCH information are called PUCCH RBs. PUCCH RBs are used by the UE to transmit only control data. PUCCH RBs are transmitted by the UE usually at a location within the carrier that is configured by RRC signaling or at a location within the carrier that is determined implicitly based on the downlink signaling from the eNB. PUSCH RBs are generally allocated to the UE via explicit scheduling grants for individual subframes. On some occasions, PUSCH RBs can be assigned to the UE on a persistent or semi-persistent basis across multiple subframes. If the PUSCH RBs are assigned on a semi-persistent basis, the assignment of PUSCH RBs in a given subframe can be overridden by an explicit scheduling grant for that subframe. RBs within any RBG are generally of the same type. The enhanced $P_{CMAX}$ and/or PH report from the UE generally comprises $P_{CMAX}$ and/or PH information for at least two RBGs of the same type. Sending $P_{CMAX}$ and/or PH information of multiple RBGs of the same type helps the eNB to schedule physical channel transmissions of that type in the appropriate RBG(s). For example, if the UE sends $P_{CMAX}$ and/or PH information for multiple PUSCH RBs in its enhanced $P_{CMAX}$ and/or PH report, the eNB can use the information in the report to schedule PUSCH on those PUSCH RBs that have higher $P_{CMAX}$ and/or larger PH.

For example, for a UL carrier with 10 MHz (50 RBs) bandwidth, detailed $P_{CMAX}$ information for various RBs within the carrier can be included in an enhanced $P_{CMAX}$ report that contains 10 separate $P_{CMAX}$ values with each value indicating the $P_{CMAX}$ for a subset of 5 RBs each (e.g., $P_{CMAX\_}1$: $P_{CMAX}$ for RB0-RB4, $P_{CMAX\_}2$: $P_{CMAX}$ for RB5-RB9, . . . $P_{CMAX\_}10$: $P_{CMAX}$ for RB45-RB49). Alternatively, detailed information for both PH and $P_{CMAX}$ can be included in an enhanced PH& $P_{CMAX}$ report (e.g., PH&$P_{CMAX\_}1$: PH and $P_{CMAX}$ for RB0-RB4, PH&$P_{CMAX\_}2$: PH and $P_{CMAX}$ for RB5-RB9, . . . PH&$P_{CMAX\_}10$: PH and $P_{CMAX}$ for RB45-RB49).

The UE can compute a separate $P_{CMAX}$ for each RB subset in the carrier for the subframe based on the power back-off that it has to apply if it is given a resource allocation in that RB subset. The UE can determine the power backoff for each RB subset based on a reference Modulation Scheme (e.g., assuming QPSK) and the corresponding MPR associated with the Modulation scheme. The UE can also determine the power back-off for each RB subset based on any additional ACLR and spectral emissions requirements that it has to meet if it transmits on that RB subset and based on the A-MPR allowance associated with those ACLR and spectral emissions requirements. The UE can also determine the power back-off for each RB subset based on any additional back-off needed to account for simultaneous PUSCH and PUCCH transmissions or non-contiguous PUSCH transmissions. The UE can also determine the power back-off for each RB subset based on any additional back-off needed to account for terminal power management during multi-RAT operation (e.g., simultaneous LTE and 1xRTT or, simultaneous LTE and WiFi or simultaneous LTE and Bluetooth transmission). In general, the UE can determine the power back-off for each RB subset in a carrier for a subframe based one or more of the multiple factors described above.

In one embodiment where a particular power back-off is required for one set of RBs, the UE includes the particular power back-off in the determination of the corresponding $P_{CMAX}$ value and but the particular power back-off is not included in the determination of the $P_{CMAX}$ value for other sets of RBs. In another embodiment, where a particular power back-off is required for a first set of Resource Blocks (RBs) and a particular power back-off is not required for a second set of RBs in a subframe, the UE determines a configured maximum transmit power ($P_{CMAX}$) value corresponding to the second set of RBs and sends a report to the base station including the $P_{CMAX}$ value and identification information for the first set of RBs.

In one implementation, a UE supporting simultaneous CDMA (1x RTT) and LTE will typically have to apply a back-off to a particular subset of RBs within its LTE carrier (e.g., a subset UL PUSCH RBs that desense the LTE DL signals of the UE) when it is simultaneously transmitting on a CDMA (1xRTT) carrier in the same subframe. The power back-off is typically needed to meet terminal power management requirements and to reduce Inter-modulation (IM) and other spurious spectral emissions outside the UE's LTE and/or CDMA carrier. Thus in embodiments where the UE simultaneously communicates using first and second RATs, the first $P_{CMAX}$ value is reduced by a particular power back-off value to satisfy power management requirements.

The subset of RBs for which the UE has to apply power back-off on the LTE carrier can be based on the CDMA channel used by the UE on the CDMA carrier. Also, no back-off may be required for the RBs outside the subset. For example, for a particular UE, for a given subframe, if:

CDMA Channel 1 is active for CDMA carrier: UL RBs 44-49 need large back-off (e.g., 10 dB) while other RBs need no back-off for LTE carrier;

CDMA Channel 2 is active for CDMA carrier: UL RBs 47-49 need large back-off (e.g., 10 dB) while other RBs need no back-off for LTE carrier; and CDMA Channels>2 active for CDMA carrier: No back-off is required for any UL RB in the LTE carrier.

For this UE, if a CDMA call is active on CDMA channel 1 and the nominal UE maximum transmit power is 23 dBm and, assuming that the UE does not need to back-off its power for other reasons (e.g., no back-off allowances are given to the UE to account for MCS or ACLR and additional spectral requirements (i.e., MPR=0, A-MPR=0 and $\Delta T_C$=0), the $P_{CMAX}$ of the UE for RBs 44-49 should reflect a relatively large back-off (e.g., $P_{CMAX}$=23−10=13 dBm) and the $P_{CMAX}$ of the UE for other RBs should reflect a relatively small or no power back-off (e.g., $P_{CMAX}$=23−0=23 dBm). With enhanced $P_{CMAX}$ reporting, the UE can send $P_{CMAX}$ reports for all RB subsets for a given subframe. The contents of an exemplary $P_{CMAX}$ report from the UE to the eNB for a given subframe for this scenario are shown in Table 1. The RB subset information shown in Table 1 may typically be known to both UE and eNB and may be optionally excluded from the report.

TABLE 1

Example for enhanced $P_{CMAX}$ report

| RBG Index | RB subset (optionally transmitted) | $P_{CMAX}$ (dBm) |
| --- | --- | --- |
| 0 | 0-4 | 23 |
| 1 | 5-9 | 23 |
| 2 | 10-14 | 23 |
| 3 | 15-19 | 23 |
| 4 | 20-24 | 23 |
| 5 | 25-29 | 23 |
| 6 | 30-34 | 23 |
| 7 | 35-39 | 23 |
| 8 | 40-44 | 13 |
| 9 | 45-49 | 13 |

If the $P_{CMAX}$ for a UE varies between different RBs within a RBG, the UE can either report an average $P_{CMAX}$ value or report a minimum $P_{CMAX}$ value for that RBG. In the example in Table 1, for RBG index 8, $P_{CMAX}$ for RBs 40-43 is 23 dBm while the $P_{CMAX}$ for RB 44 is 23−10=13 dBm. Here it was assumed that the UE reports the minimum $P_{CMAX}$ for that RBG and so 13 dBm is reported for the RBG comprising RBs 40-44.

If a regular $P_{CMAX}$ reporting mechanism was used, the UE would have reported a single $P_{CMAX}$ of either 23 dBm or 23−10=13 dBm for the subframe depending on whether its LTE UL RB allocation in that sub-frame is within or outside RBs 44-49. With the regular $P_{CMAX}$ reporting mechanism, unless the eNB grants different RBs in different subframes and keeps track of multiple regular $P_{CMAX}$ reports across the different sub-frames and separates time-domain and frequency domain $P_{CMAX}$ variation, it cannot optimize its scheduler to allocate RBs with higher $P_{CMAX}$. On the other hand, if the UE sends the enhanced $P_{CMAX}$ report as shown in Table 1 for a given subframe, the eNB can use the information in the enhanced $P_{CMAX}$ report to avoid scheduling the UE in RBs corresponding to RBGs with lower reported $P_{CMAX}$ value.

In the example shown in Table 1, the ordering of RBs from RB0 to RB49 can be based on a mapping that directly corresponds to the physical locations of RBs within the carrier/serving cell. For example, RB0 can be the RB occupying the lowest frequency region within the carrier, while RB49 can be the RB occupying the highest frequency region within the carrier. Alternatively, the ordering of RBs from RB0 to RB49 can be based on a logical indexing where the physical location of the RBs in the carrier is determined using a mapping rule or mapping function applied to the RB index.

In some implementations, the UE may send only $P_{CMAX}$ information (instead of both PH and $P_{CMAX}$ information) for different RB subsets within a carrier in its detailed report for a given subframe. Assuming $P_{CMAX}$ information for each RB subset fits within 1 byte, the enhanced $P_{CMAX}$ report (or frequency domain $P_{CMAX}$ report) for a system with 50 RBs and RB subset (or RBG) size of 5 RBs will be 10 bytes.

In some other implementations, the UE may send both $P_{CMAX}$ and PH information in its detailed report for different RB subsets in a carrier/serving cell for a given subframe. Sending both $P_{CMAX}$ and PH information helps the eNB schedule the UE even more efficiently as the PH report allows the eNB to avoid estimating the current transmit power of the UE. In such implementations, the UE computes a separate PH value for each RB subset and the PH value is determined using the $P_{CMAX}$ value of that subset and a transmission power value estimated by the UE for that subset in that subframe. The UE can determine the transmission power value using path loss estimates for the carrier/serving cell in that subframe, open loop power control parameters received for the carrier/serving cell, power control command accumulation state maintained at the UE for the carrier/serving cell. While computing the transmission power value, the UE can use the UL RB allocation received from the eNB for that subframe (the UL RB allocation can be different from the RB subset for which PH is being computed) or, alternatively, the UE can use a reference UL RB allocation. If the UE uses a reference UL RB allocation, the reference UL RB allocation can be the same as the RB subset for which PH is being computed. Alternatively, the reference UL RB allocation can be a fixed set of RBs known a priori to the UE and eNB. Alternatively, the reference UL RB allocation can be a reference set of RBs signaled to the UE from the eNB.

In current LTE systems, the UE transmits a regular $P_{CMAX}$ or PH report based on certain timers and trigger conditions. For example in LTE Rel-8 and Rel-10, the UE maintains a prohibit-PHR a periodic-PHR timer. The UE transmits a regular PH and/or $P_{CMAX}$ report whenever its periodic-PHR timer expires. For example, the periodic-PHR timer can expire every 50 subframes. If each subframe has a 1 ms duration, this implies that UE reports regular PH and/or $P_{CMAX}$ report every 50 ms. The UE also reports a regular PH and/or $P_{CMAX}$ report for a particular carrier/serving cell when it detects a large change in measured DL path loss for that carrier/serving cell. To reduce reporting overhead for regular PH and/or $P_{CMAX}$ reports, the eNB typically configures the UE with a prohibit-PHR timer that the UE starts after sending each PH and/or $P_{CMAX}$ report. The UE does not send any regular PH and/or $P_{CMAX}$ reports until the prohibit-PHR timer expires.

Similar to the regular $P_{CMAX}$ and/or PH reports, enhanced $P_{CMAX}$ and/or PH reports can be sent by the UE in within a PUSCH transmission in a sub-frame, if some trigger conditions are satisfied. The trigger conditions can be similar to regular $P_{CMAX}$ and/or PH reports (e.g., expiry of periodic-PHR timer, expiry of prohibit-PHR timer, presence of a new PUSCH transmission).

Alternatively, given the relatively higher overhead for enhanced $P_{CMAX}$ and/or PH reports, the eNB can configure separate prohibit-PHR and periodic-PHR timers for enhanced $P_{CMAX}$ and/or PH reports. The separate timers can be based on the timers already configured for regular $P_{CMAX}$ and/or PH reports (e.g., a periodic-PHR timer duration for enhanced $P_{CMAX}$ and/or PH reports twice that of regular $P_{CMAX}$ and/or PH reports). Alternatively, the eNB can configure a separate set of timers for enhanced $P_{CMAX}$ and/or PH reporting using Radio Resource Control (RRC) layer signaling.

Since the enhanced $P_{CMAX}$ and/or PH reports contain more information (and therefore more uplink overhead) triggering of these reports can be conditioned on onset of certain actions taken at the UE. For example, the UE can send an enhanced $P_{CMAX}$ and/or PH report only during initial and termination of a simultaneous 1xCDMA voice call. Other examples include initiation/termination of simultaneous LTE and WiFi or simultaneous LTE and Bluetooth sessions.

In another example, the UE can send an enhanced $P_{CMAX}$ and/or PH report for a carrier in a given sub-frame if it determines that the difference in $P_{CMAX}$ and/or PH value between any two RBGs within the carrier exceeds a certain threshold value. The threshold value can be known a priori to both UE and eNB. Alternatively, the threshold value can be signaled to the UE via RRC signaling.

The enhanced $P_{CMAX}$ and/or PH report can contain $P_{CMAX}$ and/or PH values for all the RBGs within a carrier. Alternatively, the report may contain $P_{CMAX}$ and/or PH values for only a certain subset of RBGs within the carrier. In another alternative, the enhanced $P_{CMAX}$ and/or PH report can simply comprise the RBG indices of RBGs whose $P_{CMAX}$ and/or PH value is below a certain threshold as the UE has to apply a back-off for those RBGs. Generally separate threshold values are used for $P_{CMAX}$ and PH. The threshold values can be known a priori to both UE and eNB. Alternatively, the threshold values can be signaled to the UE via RRC signaling.

Also, given the relatively large overhead of enhanced $P_{CMAX}$ and/or PH reports, the UE may be restricted to send these reports in a sub-frame only if the PUSCH allocation for that sub-frame exceeds a certain number of RBs (e.g., only if M_PUSCH>4) and/or the spectral efficiency of the PUSCH allocation for that sub-frame exceeds a certain threshold (e.g. I_MCS>10).

In one embodiment, the eNB explicitly requests an enhanced $P_{CMAX}$ and/or PH report from the UE. The explicit enhanced $P_{CMAX}$ and/or PH report request can optionally contain information about the subset of RBGs for which the detailed $P_{CMAX}$ and/or PH information is requested. In one implementation, the request from the eNB is sent via a special Physical Downlink Control Channel (PDCCH) message or by a bit in a PDCCH message or by a Medium Access Control (MAC) layer message or by a RRC message. The eNB can explicitly request an enhanced $P_{CMAX}$ and/or PH report from the UE whenever it detects a repeated failure to receive data from the UE, or whenever it determines that the UE is performing a multi-RAT transmission or whenever it needs accurate $P_{CMAX}$ and/or PH information for uplink scheduling purposes.

Thus in implementations where the UE receives an explicit request for a $P_{CMAX}$ and/or PH report, the request may be received from the base station within a physical downlink control channel (PDCCH) message or in a medium access control (MAC) layer message or in a radio resource control (RRC) message. In one particular implementation, the UE receives an explicit request from the base station within a physical downlink control channel (PDCCH) message where the PDCCH message includes identification information identifying an uplink carrier, the first and second sets of RBs, and resource blocks on the uplink carrier on which the composite report is to be sent.

The explicit $P_{CMAX}$ and/or PH report requesting mechanism can also be used for regular $P_{CMAX}$ and/or PH reports. In such implementations, explicit $P_{CMAX}$ and/or PH report request can contain information identifying whether the UE should transmit a regular $P_{CMAX}$ and/or PH report or an enhanced $P_{CMAX}$ and/or PH report.

In implementations where PDCCH messages are used for explicit $P_{CMAX}$ and/or PH report requests, the eNB can use the same PDCCH message for granting PUSCH resources to the UE for transmitting UL user data and $P_{CMAX}$ and/or PH reports. This can be done by the eNB by embedding a "$P_{CMAX}$ report request bit" and/or a "PH report request bit" within the PDCCH message. User data is also referred to as UL-Shared Channel (UL-SCH) data. Alternatively, the eNB may send a PDCCH grant to the UE allocating PUSCH resources to transmit only $P_{CMAX}$ and/or PH information without UL-SCH data. In this case, the eNB may signal a special sequence of bit fields in the PDCCH message (e.g., all ones or all zeros for some parameters in the UL grant or reserving some parameters in the UL grant to a particular parameter value). The UE can differentiate between an UL PDCCH message granting PUSCH resources for UL-SCH and an UL PDCCH message granting PUSCH resources for transmitting only $P_{CMAX}$ and/or PH information based on the special sequence of bit fields.

In some implementations, if the UE has a prohibit-PHR timer running and if the UE receives an explicit $P_{CMAX}$ and/or PH report request, the UE can override the prohibit-PHR timer and transmit the $P_{CMAX}$ and/or PH report as requested by the eNB. The UE may also optionally reset its prohibit-PHR timer whenever it receives an explicit $P_{CMAX}$ and/or PH report request.

In cases where non-contiguous PUSCH transmissions are supported, the back-off used by the UE depends not only on the number of RBs allocated to the UE but also on the frequency location of the allocated RBs. For example, a UE would require a large back-off (e.g., 12 dB to fulfill ACLR and spectral emissions mask requirements) for transmission of two RBs allocated at opposite band edges. If the RBs were allocated right next to each other, the required back-off is much smaller (e.g., 0 dB). Enhanced $P_{CMAX}$ and/or PH reporting can be used to aid the eNB for scheduling non-contiguous resource allocations. In one approach, the UE can report $P_{CMAX}$ for UL transmissions considering a combination of RBGs. For example, if a carrier has 10 RBGs, the UE can report $P_{CMAX}$ values for combination of RBGs such as (RBG0 & RBG1, RBG0 & RBG2, ... RBG0 & RBG9), (RBG1 & RBG, RBG1 & RBG3, ... RBG1 & RBG9), ... (RBG8 & RBG9) in a single detailed $P_{CMAX}$ report. Given the large number of combinations possible (10 choose 2=45 combinations=45 bytes for the example) the overhead of these more detailed enhanced $P_{CMAX}$ report is much higher.

In LTE, PUSCH RBs and PUCCH RBs are generally transmitted by the UE in different subframes. In some cases the eNB may configure the UE to simultaneously transmit both PUSCH RBs and PUCCH RBs in the same subframe. In such cases, the UE can report separate $P_{CMAX}$ and/or PH information corresponding to both PUSCH type and PUCCH type RBs. In one embodiment, the UE can include $P_{CMAX}$ and/or PH information for multiple sets of PUSCH RBs (i.e., multiple PUSCH RBGs) and also include $P_{CMAX}$ and/or PH information corresponding to one or multiple sets of PUCCH RBs in its enhanced $P_{CMAX}$ and/or PH report.

In some embodiments, the UE can determine that a particular power back-off value is required for some RBGs and not required for the remaining RBGs within a carrier in a common subframe. The particular power back-off can be required for terminal power management, for example, when the UE is performing a simultaneous multi-RAT transmissions such as simultaneous LTE and CDMA or simultaneous LTE and WiFi or simultaneous LTE and Bluetooth transmissions. In order to decrease the reporting overhead of enhanced $P_{CMAX}$ and/or PH reports, the UE can simply report the $P_{CMAX}$ and/or PH value of the RBGs that do not require the particular power back-off and also include information identifying the RBGs (e.g., RBG indices of those RBGs) that require the particular power back-off. Such a report helps the eNB avoid scheduling transmissions on the RBGs that require the particular power back-off (blacklisted RBGs) and schedule transmissions on the RBGs that do not require the back-off based on the reported $P_{CMAX}$ and/or PH values for those RBGs. The UE may send such a report based on an explicit request for a report with blacklisted RBGs from the eNB. Once the eNB receives such an enhanced $P_{CMAX}$ and/or PH report it may optionally choose to not schedule the UE on the blacklisted RBGs for a specified time duration that is either known a priori to both UE and eNB or signaled to the UE via the eNB (e.g., a specified number of subframes). After the specified time duration the UE can optionally send another report to the eNB indicating any changes to the blacklisted RBGs. The lack of inclusion of such blacklisted RBGs can be used by the eNB to imply that the UE is no longer operating in a mode that requires it to apply the power back-off for some RBGs. The UE may also indicate a resumption of a normal mode of operation without any power back-off for some RBGs through setting of a bit in the enhanced $P_{CMAX}$ and/or PH reports. In order for the eNB to be able to decode the enhanced $P_{CMAX}$ and/or PH report, some signaling through the report header may be required so that the eNB can distinguish whether the UE has included information identifying the blacklisted RBGs in the enhanced $P_{CMAX}$ and/or PH report.

In another embodiment for signaling enhanced $P_{CMAX}$ and/or PH reports, a two cluster approach (such as Uplink Resource allocation type 1 given in sub-clause 8.1.2 of the 3GPP RAN WG1 technical specification (TS) 36.213 version 10.0.1) is used where the starting and ending resource block group (RBG) index for each cluster is given along with the corresponding $P_{CMAX}$ for each cluster. Note each cluster consists of one or more consecutive RBGs of size P. The $P_{CMAX}$ for the RBGs not included in the cluster can be assumed to be equal to P_powerclass or equal to previously reported $P_{CMAX}$ for those frequency locations. In one embodiment the UE reports to a given serving cell some number of clusters (e.g., 2) and their frequency portion (or the resource blocks) of the carrier they span and also reports the $P_{CMAX}$ for each cluster. One way to efficiently indicate cluster information for two clusters is to use uplink resource allocation type 1. The UE decides which clusters to report based on some interference level trigger. For example, when interference due to a particular RAT passes a threshold or when the interference for certain sets of resource blocks (e.g., as seen by the UE's receiver for a given RAT) will be excessive or pass a threshold. The resource allocation information for uplink resource allocation type 1 indicates to a scheduled UE two sets of resource blocks with each set including one or more consecutive resource block groups of size P as given in table 7.1.6.1-1 of TS 36.213 version 10.0.01 for uplink system bandwidth $N_{RB}^{UL}$. A resource allocation field in the scheduling grant consists of a combinatorial index r corresponding to a starting and ending RBG index of resource block set 1, $s_0$ and $s_1-1$, and resource block set 2, $s_2$ and $s_3-1$ respectively, where r is given by equation $$r = \sum_{i=0}^{M-1} \binom{N-s_i}{M-i}$$

defined in section 7.2.1 of TS 36.213 v10.0.1 with M=4 and N=$\lceil N_{RB}^{UL}/P \rceil$+1. Section 7.2.1 also defines ordering properties and range of values that $s_i$ (RBG indices) map to. Only a single RBG is allocated for a set at the starting RBG index if the corresponding ending RBG index equals the starting RBG index. In another embodiment a serving cell schedules (via a grant) a UE to report a distinct $P_{CMAX}$ value (or $P_{CMAX}$ information) for each of a set of frequency portions of one of the UE's assigned uplink carriers. The grant transmitted to the UE includes resource identification information (e.g., based on uplink resource allocation type 1) corresponding to the desired frequency portions (or resource block clusters or sets of RBGs) that a $P_{CMAX}$ value (or information) should be computed for by the UE where the $P_{CMAX}$ values are then reported for the frequency portions by transmitting the $P_{CMAX}$ values (information) on predefined, or semi-statically configured, persistently or dynamically scheduled, or implicitly indicated uplink resources.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device, the method comprising:
   determining a first configured maximum transmit power ($P_{CMAX}$) value corresponding to a first set of resource blocks (RBs) having a first set of subcarriers in a carrier for a subframe, the first set of RBs including less than a complete set of RBs constituting the carrier;
   determining a second $P_{CMAX}$ value corresponding to a second set of RBs having a second set of subcarriers in the same carrier for the subframe, the first and second sets of RBs containing RBs of a common type, the second set of RBs different from the first set of RBs and the second set of RBs including less than the complete set of RBs constituting the carrier;
   determining a difference between the first $P_{CMAX}$ value corresponding to the first set of RBs having the first set of subcarriers in the carrier for the subframe and the second $P_{CMAX}$ value corresponding to the second set of RBs having the second set of subcarriers in the same carrier for the subframe; and
   sending a composite report for the subframe including at least the first $P_{CMAX}$ value corresponding to the first set of RBs having the first set of subcarriers in the carrier for the subframe and the second $P_{CMAX}$ value corresponding to the second set of RBs having the second set of subcarriers in the same carrier for the subframe to a base station in response to determining that the difference between the first $P_{CMAX}$ value and the second $P_{CMAX}$ value exceeds a threshold.

2. The method of claim 1 wherein the first and second sets of RBs are partially overlapping in the frequency domain.

3. The method of claim 1, wherein the first and second sets of RBs are different in the frequency domain.

4. The method of claim 1 further comprising sending an identification of the first and second sets of RBs to the base station.

5. The method of claim 1,
   determining the first $P_{CMAX}$ value for the first set of RBs for a first temporal portion of the subframe,
   determining the second $P_{CMAX}$ value for the second set of resource blocks (RBs) for a second temporal portion of the subframe,
   wherein the first and second temporal portions of the subframe are non-overlapping.

6. The method of claim 1 further comprising sending the composite report to the base station in response to receiving an explicit request from the base station for an enhanced $P_{CMAX}$ report.

7. The method of claim 6, receiving the explicit request from the base station within a physical downlink control channel (PDCCH) message or a medium access control (MAC) layer message or an radio resource control (RRC) message.

8. The method of claim 6, receiving the explicit request from the base station within a physical downlink control channel (PDCCH) message where the PDCCH message includes identification information identifying an uplink carrier, the first and second sets of RBs, and resource blocks on the uplink carrier on which the composite report is to be sent.

9. The method of claim 1,
   wherein the second set of RBs does not overlap with the first set of RBs,
   wherein the first and second sets of RBs constitute a complete set of physical uplink shared channel (PUSCH) RBs of the carrier.

10. The method of claim 9 further comprising:
    communicating using a first radio access technology (RAT) on the carrier in the subframe;
    communicating using a second RAT while communicating using the first RAT on the carrier in the subframe;
    the first and second $P_{CMAX}$ values for the first and second sets of RBs are for the first RAT on the carrier in the subframe, wherein only the first $P_{CMAX}$ value for the first set of RBs is reduced by a particular power back-off value to satisfy power management requirements.

11. The method of claim 1 further comprising:

the first set of RBs includes at least two RBs, determining the first $P_{CMAX}$ value includes determining a $P_{CMAX}$ value for each of the at least two RBs wherein the $P_{CMAX}$ value for one of the at least two RBs is lower than a $P_{CMAX}$ value for the other of the at least two RBs, and sending the first $P_{CMAX}$ value to the base station includes reporting only the lower $P_{CMAX}$ value to the base station.

12. The method of claim 1 further comprising:

determining a first Power Headroom (PH) value corresponding to the first set of RBs;

determining a second PH value corresponding to the second set of RBs;

sending first PH value and the second PH value in the composite report.

13. The method of claim 1 wherein sending the composite report occurs during an initiation or termination of two simultaneous wireless device communication sessions.

* * * * *